United States Patent [19]

Krapchev

[11] Patent Number: 5,153,887
[45] Date of Patent: Oct. 6, 1992

[54] INFRARED LASER SYSTEM

[76] Inventor: Vladimir B. Krapchev, 80 Park St., Brookline, Mass. 02146

[21] Appl. No.: 657,641

[22] Filed: Feb. 15, 1991

[51] Int. Cl.$^5$ .............................................. H01S 3/30
[52] U.S. Cl. ........................................ 372/3; 372/4; 372/51
[58] Field of Search ................................ 372/3, 4, 51

[56] References Cited

U.S. PATENT DOCUMENTS

| 3,668,420 | 6/1972 | Vanderslice | 302/88.3 |
| 4,254,348 | 3/1981 | Stappaerts | 307/426 |
| 4,327,337 | 4/1982 | Liu | 372/3 |
| 4,973,157 | 11/1990 | Kasinski et al. | 372/3 |

OTHER PUBLICATIONS

J. G. Meadors et al, "Generation of Infrared Radiation . . . " J. Quantum Electronics, vol. QE-8, No. 4, Apr. 1972, pp. 427-428.
A. V. Krumin'sh et al, Sov. J. Quantum Electron. vol. 14, No. 7, Jul. 1984, pp. 1001-1002.
C. Guntermann et al, Applied Optics, vol. 28, No. 1, Jan. 1, 1989, pp. 135-138.
E. Patterson et al, Applied Optics, vol. 28, No. 23, Dec. 1, 1989, pp. 4978-4981.
J. Hampton, "A Terrestrial Optical Scatter Communications Model", 1989, pp. 263-268.
M. J. Colles, Optics Communications, vol. 1, No. 4, Sep./Oct. 1963, pp. 169-172.
D. C. Hanna et al, IEEE J. Quantum Electronics, vol. QE-22, No. 2, Feb. 1986, pp. 332-336.
T. R. Loree, IEEE J. Quantum Electronics, vol. QE-15, No. 5, May 1979, pp. 337-342.
J. J. Ottusch et al, IEEE J. Quantum Electronics, vol. 24, No. 10, Oct. 1988, pp. 2076-2080.
"Tables of Molecular Vibrational Frequencies, v. 1", Nat. Bureau of Standards, 1972, pp. 63-66.
C. J. Pouchert, "The Aldrich Library of IR Spectra" 2nd Ed., 1978 (one sheet).
D. Schiel et al, Chemical Physics Letters, vol. 166, No. 1, Feb. 9, 1990, pp. 82-86.
S. J. Pfeifer, Proc. SPIE, vol. 1000, Laser Wavefront Control, 1988, pp. 33-42.
J. Munch et al, Applied Optics, vol. 28, No. 15, Aug. 1, 1989, pp. 3099-3105.
D. Stern et al, Opthamology, vol. 95, No. 10, Oct. 1988, pp. 1434-1441.
M. Falk et al., J. Chemical Physics, vol. 34, No. 5, May 1961, pp. 1554-1568.

Primary Examiner—James W. Davie
Attorney, Agent, or Firm—Wolf, Greenfield & Sacks

[57] ABSTRACT

An infrared laser system includes a neodymium laser for generating a pulsed laser beam at a wavelength of 1.06 micrometers and a Raman cell containing a Raman active medium. The laser beam, having sufficient peak power to cause emission of light from the Raman active medium by stimulated Raman scattering, is directed through the Raman cell. Ethanol-$d_1$ or methanol-$d_1$ is used as the Raman active medium to generate wavelengths of about 2.8-2.9 micrometers. The laser is preferably a neodymium YAG laser.

16 Claims, 1 Drawing Sheet

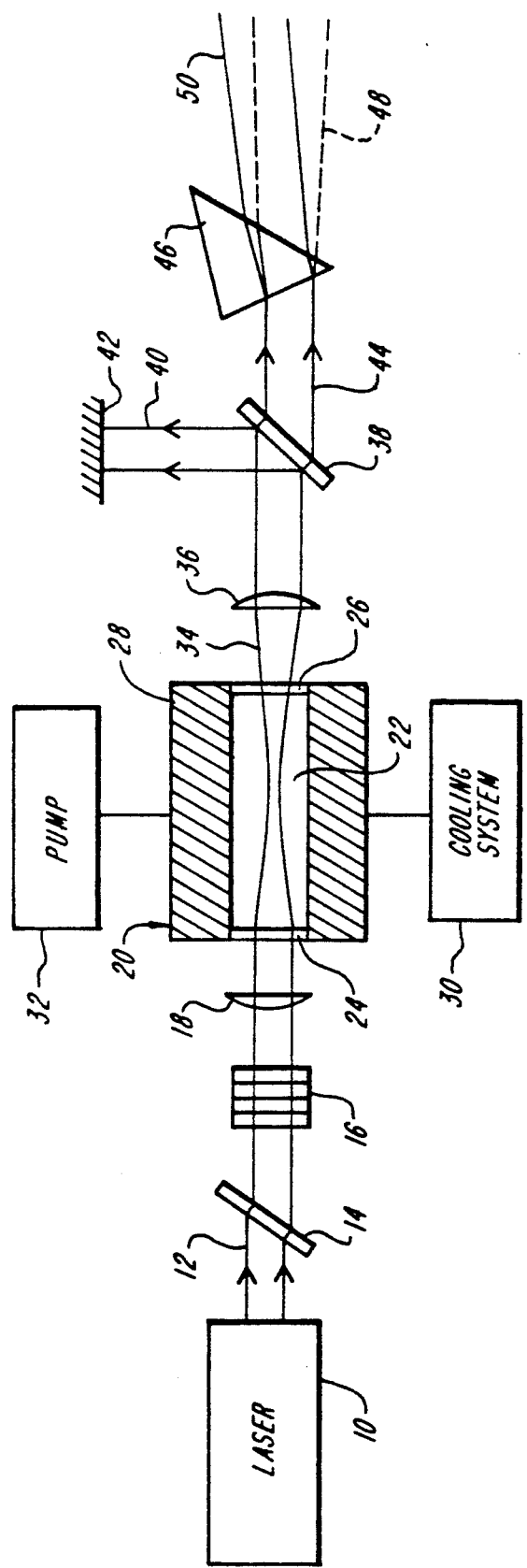

5,153,887

INFRARED LASER SYSTEM

FIELD OF THE INVENTION

This invention relates to laser systems for generating radiation at wavelengths of about 1.5 micrometers and wavelengths of about 2.8–2.9 micrometers and, more particularly, to laser systems for frequency shifting the light from a neodymium laser by stimulated Raman scattering.

BACKGROUND OF THE INVENTION

A desirable wavelength for laser radar (lidar) and over the horizon optical communications is 1.5 micrometers because this wavelength is considered to be eye-safe. Wavelengths in the range of about 2.8–2.9 micrometers have been found useful for medical applications such as laser surgery because these wavelengths are highly absorbed by the water in tissue and thus are effective for vaporizing tissue. However, reliable, low cost, high power lasers for directly generating such wavelengths are not commercially available.

Pulsed neodymium doped yttrium aluminum garnet (Nd:YAG) lasers are commercially available from a number of suppliers and are used in many fields due to their relatively low cost, large average and peak powers and high pulse repetition frequencies. A well known method for frequency shifting a laser toward longer wavelengths is by stimulated Raman scattering. A laser beam is directed through a Raman cell containing a Raman active medium. When the intensity of the laser beam exceeds a threshold value, light is emitted by the Raman medium at a wavelength that is longer than the wavelength of the laser beam. The output of the Raman cell includes light at the laser wavelength and at the shifted wavelength. The frequency shift and the conversion efficiency are characteristics of the Raman medium.

The use of methane for Raman shifting of a neodymium YAG laser output at 1.06 micrometers to a wavelength of 2.8 micrometers is disclosed by Guntermann et al in *Applied Optics*, Vol. 28, No. 1, Jan. 1, 1989, pages 135–138. Medical applications are suggested. The generation of 1.54 micrometer radiation for laser radar using methane as a Raman active medium is disclosed by Patterson et al in *Applied Optics*, Vol. 28, No. 23, Dec. 1, 1989, pages 4978–4981. Deposition of soot like particles on the Raman cell windows was reported to limit the operating life of the system.

Raman scattering using methyl, ethyl and isopropyl alcohol, acetone, trichloroethane and water as Raman active media is disclosed by Colles in *Optics Communications*, Vol. 1, No. 4, September/October 1969, pages 169–172. Picosecond pulses at 530 nanometers, which were provided by second harmonic generation of the output of a neodymium glass laser, were used as the pump pulses. Stimulated Raman scattering of 100 picosecond pulses in hydrogen, deuterium and methane is disclosed by Hanna et al in *IEEE Journal of Quantum Electronics*, Vol. QE 22, No. 2, February 1986, pages 332–336. A mode locked and Q-switched neodymium YAG laser followed by a second harmonic generator was used to generate pump pulses at 1.06 micrometers and 0.53 micrometers. The use of hydrogen, deuterium and methane as Raman active media are also disclosed by Lorre et al in *IEEE Journal of Quantum Electronics*, Vol. QE 15, No. 5, May 1979, pages 337–342 and by Ottusch et al in *IEEE Journal of Quantum Electronics*, Vol. 24, No. 10, October 1988, pages 2076–2080.

A Raman cell positioned inside a neodymium YAG laser resonant cavity is disclosed in U.S. Pat. No. 4,327,337, issued Apr. 27, 1982 to Liu. Deuterium is suggested as a Raman active medium. A 1.5 micron Raman laser is disclosed in U.S. Pat. No. 3,668,420, issued Jun. 6, 1972 to Vanderslice. A laser system for generating radiation in the ultraviolet wavelength range using a plurality of Raman cells is disclosed in U.S. Pat. No. 4,254,348, issued Mar. 3, 1981 to Stappaerts. Deuterium is disclosed as a Raman active medium.

All the known techniques for generation of radiation at 1.5 micrometers and 2.8–2.9 micrometers have been subject to one or more problems, including a short operating life, low efficiency and Brillouin backscattering from the Raman active medium. It is desirable to provide laser systems which overcome these problems.

It is a general object of the present invention to provide improved laser systems.

It is another object of the present invention to provide laser systems for efficient Raman shifting of the 1.06 micrometer radiation from a neodymium laser to about 1.5 micrometers.

It is a further object of the present invention to provide laser systems for efficient Raman shifting of the 1.06 micrometer radiation from a neodymium laser to about 2.8–2.9 micrometers.

It is another object of the present invention to provide reliable, long life laser systems for generating radiation at about 1.5 micrometers and about 2.8–2.9 micrometers.

It is yet another object of the present invention to provide Raman active media for efficient conversion of 1.06 micrometer radiation to radiation at about 1.5 micrometers and about 2.8–2.9 micrometers.

SUMMARY OF THE INVENTION

According to the present invention, these and other objects and advantages are achieved in an infrared laser system including a neodymium laser for generating a pulsed laser beam at a wavelength of 1.06 micrometers, a Raman cell containing a Raman active medium and means for coupling the laser beam through the Raman cell, the laser beam having sufficient peak power to cause emission of light from the Raman active medium by stimulated Raman scattering. Depending on the Raman active medium and the peak power of the laser beam, the output of the laser system is at a wavelength of about 1.5 micrometers, at a wavelength of about 2.8–2.9 micrometers, or both. The Raman active media in accordance with the invention convert the laser beam at 1.06 micrometers to the desired wavelengths with high efficiency.

According to one embodiment of the invention, the laser comprising a mode locked neodymium YAG laser having a pulse width of 100 picoseconds or less. The Raman active medium comprises ethanol which provides an output wavelength of 1.54 micrometers, methanol which provides output wavelengths of 1.51 micrometers and 1.54 micrometers, or ethanol-$d_1$ which provides an output wavelength of 2.79 micrometers.

According to another embodiment of the invention, the laser comprises a broadband, Q-switched neodymium YAG laser having a pulse width of one nanosecond or greater. The laser has a bandwidth $E_B$ greater than one cm$^{-1}$. The Raman active medium comprises ethanol, methanol or ethanol-$d_1$ having output wavelengths as specified above.

According a further embodiment of the invention, the laser comprises a Q-switched neodymium YAG laser having a pulse width of one nanosecond or greater. The Raman active medium comprises deuterium gas at a pressure of 20 atmospheres or greater. When the peak power of the laser beam exceeds the threshold for generation of the first Stokes component, the output wavelength is 1.55 micrometers. When the peak power of the laser beam exceeds the threshold for generation of the second Stokes component, the output wavelengths are 1.55 micrometers and 2.89 micrometers.

In the laser system, the means for coupling the laser beam through the Raman cell typically includes a lens for focusing the laser beam in the Raman active medium. The coupling means preferably further includes a polarizer and a Faraday rotator for isolating the laser from radiation that is backscattered from the Raman cell.

The Raman cell includes an input window for receiving the laser beam, an output window and means for containing the Raman active medium between the input window and the output window. The Raman cell typically includes means for cooling the Raman active medium. The Raman active medium can be circulated through the Raman cell.

The laser system according to the invention typically includes an output lens for collimating the output of the Raman cell. The outputs of the Raman cell can be separated into individual wavelengths by one or more dichroic beam splitters or prisms.

BRIEF DESCRIPTION OF THE DRAWINGS

For a better understanding of the present invention, together with other and further objects, advantages and capabilities thereof, reference is made to the accompanying drawing which is incorporated herein by reference and in which:

The sole FIGURE is a schematic diagram of an infrared laser system in accordance with the present invention.

DETAILED DESCRIPTION OF THE INVENTION

An infrared laser system in accordance with the present invention is shown in the drawing. A laser 10 generates a laser beam 12 at a wavelength of 1.06 micrometers. The laser 10 is a pulsed neodymium laser and is preferably a neodymium doped yttrium aluminum garnet (Nd:YAG) laser. A neodymium glass laser can also be utilized when a relatively low pulse repetition rate is acceptable. As described hereinafter, the laser 10 can be a Q-switched device or a mode locked device, depending on the required pulse width. The laser beam 12 is directed through a polarizer 14, a Faraday rotator 16 and a lens 18 to a Raman cell 20. The Raman cell 20 includes a cavity 22 that contains a generally cylindrical Raman active medium in gaseous or liquid form. The cavity 22 is defined by an input window 24, an output window 26 and a generally cylindrical Raman cell wall 28.

The laser beam 12 is directed through the input window 24, the Raman active medium and the output window 26. When the peak power of the laser beam 12 is above a Raman threshold of the medium, radiation is generated at a wavelength that is longer than the wavelength of the laser beam 12 by stimulated Raman scattering. In accordance with the present invention, Raman active media for conversion of the laser beam at 1.06 micrometers to wavelengths of about 1.5 micrometers, wavelengths of about 2.8–2.9 micrometers, or both, are provided. The Raman active media are discussed in detail hereinafter.

The polarizer 14 and the Faraday rotator 16 isolate the laser 10 from radiation that is backscattered from the Raman cell 20. Other techniques for suppressing backscattered radiation are known in the art. The laser beam 12 is focused in the Raman active medium by lens 18. In cases where the peak power of the laser beam 12 is sufficiently high, the lens 18 can be omitted, and a collimated laser beam can be directed through the Raman cell 20. All the optical elements in the laser system preferably include an antireflection coating that is effective to reduce reflections at 1.06 micrometers.

The wall 28 of Raman cell 20 is preferably thermally conductive to conduct heat away from the Raman active medium. An active cooling system 30 can also be used for cooling the Raman cell 20. The cooling system 30 can, for example, include a system for circulating a cooling fluid such as water through the Raman cell wall 28 for removal of heat generated in the Raman active medium. A pump 32 can be used for circulating the Raman active medium through the cavity 22.

An output beam 34 from the Raman cell 20 is directed through a lens 36 to a dichroic beam splitter 38. The output beam 34 is collimated by lens 36 and is split into its component wavelengths by beam splitter 38. The beam splitter 38 directs a first output beam component 40 at 1.06 micrometers to a beam dump 42. A second output beam component 44 includes radiation generated by the Raman active medium. Depending on the Raman active medium utilized in Raman cell 20 and the peak power of laser beam 12, the second beam component 44 can include radiation at about 1.5 micrometers, radiation at about 2.8–2.9 micrometers, or both. When the second beam component 44 contains radiation at about 1.5 micrometers and about 2.8–2.9 micrometers, a prism 46 can be utilized to separate these wavelengths. The prism 46 separates the second beam component 44 into a third beam component 48 at about 1.5 micrometers and a fourth beam component 50 at about 2.8–2.9 micrometers.

The components of the laser system must be essentially transparent to radiation at 1.06 micrometers. The input window 24 can, for example, be fused silica. The output window 26 and the lens 36 must be transparent to radiation in the wavelength range of about 1–3 micrometers. A suitable material for these components is magnesium fluoride. A suitable material for the prism 46 is calcium fluoride.

The generation by the Raman active medium of radiation at a wavelength longer than the radiation of the laser beam 12 occurs as a result of the process of stimulated Raman scattering. When the peak power of the laser beam 12 exceeds a predetermined threshold, the Raman active medium generates coherent radiation at a wavelength that is a function of the input wavelength and the Raman active medium. The frequency shift and the Raman gain coefficient are characteristics of the medium. In accordance with the present invention, deuterium gas ($D_2$), liquid ethanol ($CH_3CH_2OH$) or liquid methanol ($CH_3OH$) is used to generate wavelengths of about 1.5 micrometers. Further in accordance with the invention, deuterium gas, ethanol-$d_1$ (CH₃CH₂OD) or methanol-d₁ (CH₃OD) is used to generate wavelengths of about 2.8-2.9 micrometers. Details regarding each of the Raman active media and the characteristics of the laser 10 that is used with each Raman active medium are described below.

The threshold peak power of laser beam 12 that is required for stimulated Raman scattering in the focused geometry shown in the drawing is given by:

$$G = \frac{4gP}{\lambda} \tan^{-1} \frac{ld^2}{2\pi\lambda f^2} \quad (1)$$

where G is the total integrated gain, P is the peak power required for emission of the first Stokes component, g is the Raman gain coefficient, λ is the wavelength of laser beam 12 (1.06 micrometers), 1 is the length of the Raman cell 20 along the optical beam path, f is the focal length of lens 18, and d is the diameter of laser beam 12 at the lens 18. In order to determine the threshold power P, the total gain G is set at 30. The Raman gain coefficient g for each Raman active medium is specified in Table I below. The remaining parameters are determined from the geometry of the laser system. As an example, for d=0.3 cm, f=1 =50 cm, the threshold peak power P for a neodymium YAG laser in deuterium gas is 2.8 megawatts. For a Q-switched laser having a pulse width of 5 nanoseconds, this corresponds to 14 millijoules (mJ) per pulse. The power requirement for the generation of second Stokes light at 2.8 micrometers is three times larger.

The properties of the Raman active media in accordance with the present invention are summarized in Table I below. In Table I, g represents the Raman gain coefficient, $T_2$ represents the Raman lifetime, $g_B$ represents the Brillouin gain coefficient and $T_B$ represents the Brillouin lifetime. The data in Table I is taken from published literature.

TABLE I

| Medium | Raman Shift (cm⁻¹) | g(cm/GW) at $\lambda_s$ = 1.5 μm | $T_2$ (psec) | $g_B$ (cm/GW) | $T_B$ (nsec) |
|---|---|---|---|---|---|
| D₂ (30 atm.) | 2987 | 0.37 | 150 | N/A | N/A |
| CH₃CH₂OH | 2928 | 1.8 | 2 | 12 | 2.8 |
| CH₃CH₂OD | 2928* | 1.8* | 2* | 12* | 2.8* |
| CH₃OH | 2834 | 0.8 | 2 | 13 | 4 |
|  | 2944 | 0.6 | 3 |  |  |
| CH₃OD | 2834* | 0.8* | 2* | 13* | 4* |
|  | 2944* | 0.6* | 3* |  |  |

*Results from measurements in d₁ alcohols are unknown, but the Raman scattering and Brillouin backscattering properties are expected to be the same as those of ordinary alcohols.

In accordance with a first embodiment of the invention, the Raman active medium in cavity 22 of Raman cell 20 is deuterium gas at a pressure of 20 atmospheres or greater. The laser 10 has a pulse width of one nanosecond or greater and can be a Q-switched neodymium YAG laser. As indicated in Table I, the Raman lifetime $T_2$ for deuterium gas is 150 picoseconds. When laser pulses shorter than the Raman lifetime $T_2$ are utilized, lower efficiency is obtained. For the example given above, the threshold peak power P is 2.8 megawatts to obtain the first Stokes light at 1.55 micrometers. When the threshold peak power is increased to three times this value, the Raman cell 20 containing deuterium gas generates first Stokes light at 1.55 micrometers and second Stokes light at 2.89 micrometers. It will be understood that for different geometrical arrangements of the Raman cell 20 and lens 18, the threshold peak power differs in accordance with Equation (1).

In accordance with a second embodiment of the invention, the Raman active medium in Raman cell 20 comprises liquid ethanol or liquid methanol, and the laser 10 comprises a neodymium YAG laser having a pulse width of 100 picoseconds or less. Preferably, the laser 10 is a mode locked neodymium YAG laser. The output wavelength of the Raman cell 20 is 1.54 micrometers when the Raman active medium is ethanol. The output wavelengths of the Raman cell 20 are 1.51 and 1.54 micrometers when the Raman active medium is methanol. From Equation (1) and the geometry of the example given above, the threshold peak power P is 0.6 megawatts. For a typical mode locked pulse length of 100 picoseconds, this corresponds to an energy of 60 microjoules per pulse. Since ethanol and methanol have significant absorption near 3 micrometers, they are not suitable for generation of second Stokes components from a neodymium YAG laser at 1.06 micrometers.

One problem with the operation of Raman cells is Brillouin backscattering in which the laser beam is reflected by the Raman active medium and stimulated Raman scattering is suppressed or does not occur. When a mode locked neodymium YAG laser having a pulse width of 100 picoseconds or less and a Raman cell filled with ethanol or methanol is used, Brillouin backscattering is virtually eliminated by making it highly transient.

According to another feature of the invention, a broadband Q-switched neodymium YAG laser is used with ethanol or methanol to provide stimulated Raman scattering without significant Brillouin backscattering. The Brillouin backscattering interaction length is limited to 2-3 times the coherence length in the Raman cell. A laser bandwidth of one cm⁻¹ corresponds to a coherence length of one centimeter. However, stimulated Raman scattering takes place over the entire length of the Raman cell. Thus, by providing a Q-switched neodymium YAG laser with a laser bandwidth of one cm⁻¹ or more, Brillouin backscattering is suppressed. For a Raman cell on the order of 25-50 cm in length, stimulated Raman scattering occurs over the entire cell length, and Brillouin backscattering occurs only over a small fraction of the cell length. As a result, Brillouin backscattering is effectively suppressed.

According another embodiment of the invention, ethanol-d₁ and methanol-d₁ are used for second Stokes conversion of laser radiation at 1.06 micrometers. Ethanol-d₁ generates second Stokes light at 2.79 micrometers. The primary difference between ethanol-d₁ and ethanol is the shift of the OH stretch frequency to an OD frequency. The Raman properties are due to the CH₃ stretch mode and are not affected. For liquid methanol, the OH stretch is at 3328 cm⁻¹ and the OD stretch is at 2467 cm⁻¹. This results in absorption bands near 3 micrometers for methanol and 4 micrometers for methanol-d₁. For ethanol in the gas phase, the OH stretch frequencies are at 3660 cm⁻¹ and 3680 cm⁻¹, and the OD frequencies are at 2690 cm⁻¹ and 2710 cm⁻¹. The same pattern is expected to hold for liquid ethanol-d₁. The result is that the absorption bands of ethanol and methanol near 3 micrometers are shifted to 4 micrometers for methanol-d₁ and ethanol-d₁. Because of the two first Stokes components, methanol-d₁ is believed to produce up to four second Stokes components at a significantly reduced efficiency and is therefore less preferred than ethanol d₁.

For ethanol-$d_1$, power conversion efficiencies in excess of 20% are expected. The Raman threshold peak power for the geometry specified above is 1.8 megawatts, three times greater than the threshold for generation of single Stokes light at this wavelength. At typical pulse widths of 100 picoseconds, this corresponds to an energy of 180 microjoules per pulse. A mode locked neodymium YAG laser having a pulse width of 100 picoseconds or less or a broadband Q-switched neodymium YAG laser having a bandwidth of one cm$^{-1}$ or more can be used as the laser source with ethanol-$d_1$ or methanol-$d_1$.

The quantum efficiency of Raman conversion is given by the ratio of the laser wavelength to the Stokes wavelength. With a pump laser beam of 1.06 micrometers, the quantum efficiency for generation of a first Stokes component at 1.5 micrometers is 67%, and for the generation of a second Stokes component at 2.8-2.9 micrometers the quantum efficiency is 36-34%. Based on experiments with deuterium at excimer laser wavelengths and alcohols with frequency doubled neodymium YAG lasers, one can expect Raman conversion in excess of 50% of the quantum efficiency. The estimated power conversion efficiencies with the present invention are at least 50% to obtain radiation at 1.5 micrometers and at least 20% for radiation at 2.8-2.9 micrometers. This compares very favorably with previously reported results of 3% conversion efficiency to 2.8 micrometers using methane ($CH_4$) as the Raman medium.

While there have been shown and described what are at present considered the preferred embodiments of the present invention, it will be obvious to those skilled in the art that various changes and modifications may be made therein without departing from the scope of the invention as defined by the appended claims.

I claim:

1. An infrared laser system comprising:
   a broadband Q-switched neodymium laser for generating a pulsed laser beam having a pulse width of one nanosecond or greater and a wavelength of 1.06 micrometers;
   a Raman cell containing a Raman active medium comprising ethanol-$d_1$, said laser having a bandwidth $\Gamma_B$ of one cm$^{-1}$ or more; and
   means for coupling said laser beam through said Raman cell, said laser beam having sufficient power to cause emission of light from said Raman active medium at 2.79 micrometers.

2. A laser system as defined in claim 1 wherein said laser comprises a Nd:YAG laser.

3. A laser system as defined in claim 2 wherein said coupling means includes a lens for focusing said laser beam in said Raman active medium.

4. A laser system as defined in claim 3 wherein said coupling means further includes a polarizer and a Faraday rotator for isolating the laser from radiation that is backscattered from said Raman cell.

5. A laser system as defined in claim 4 wherein said Raman cell includes an input window for receiving said laser beam, an output window and means for containing said Raman active medium between said input window and said output window.

6. A laser system as defined in claim 3 wherein said coupling means further including means for isolating the laser from radiation that is backscattered from said Raman cell.

7. An infrared laser system comprising:
   a neodymium laser for generating a pulsed laser beam having a pulse width of 100 picoseconds or less and a wavelength of 1.06 micrometers;
   a Raman cell containing a Raman active medium comprising ethanol-$d_1$; and
   means for coupling said laser beam through said Raman cell, said laser beam having sufficient power to cause emission of light from said Raman active medium at 2.79 micrometers.

8. A laser system as defined in claim 7 wherein said laser comprises a mode locked Nd:YAG laser.

9. A laser system as defined in claim 7 wherein said Raman cell includes an input window for receiving said laser beam, an output window and means for containing said Raman active medium between said input window and said output window, and said coupling means includes a lens for focusing said laser beam in said Raman active medium.

10. A laser system as defined in claim 7 further including beam splitting means for separating said laser beam at 1.06 micrometers and said light at 2.79 micrometers.

11. An infrared system comprising:
    a neodymium laser for generating a pulsed laser beam having a wavelength of 1.06 micrometers;
    a Raman cell containing a Raman active medium comprising methanol-$d_1$; and
    means for coupling said laser beams through said Raman cell, said laser beam having sufficient power to cause emission of light from said Raman active medium at about 2.8-2.9 micrometers.

12. A laser system as defined in claim 11 wherein said laser comprises a mode-locked Nd:YAG laser having a pulse width of 100 picoseconds or less.

13. A laser system as defined in claim 11 wherein said laser comprises a broadband Q-switched Nd:YAG laser having a bandwidth of one cm$^{-1}$ or more.

14. A laser system as defined in claim 11 wherein said Raman cell includes an input window for receiving said laser beam, an output window and means for containing said Raman active medium between said input window and said output window, and said coupling means includes a lens for focusing said laser beam in said Raman active medium.

15. An infrared laser system comprising:
    a neodymium laser for generating a pulsed laser beam having a wavelength of 1.06 micrometers;
    a Raman cell containing a Raman active medium comprising ethanol-$d_1$; and
    means for coupling said laser beams through said Raman cell, said laser beam having sufficient power to cause emission of light from said Raman active medium.

16. An infrared laser system comprising:
    a neodymium laser for generating a pulsed laser beam having a wavelength of 1.06 micrometers;
    a Raman cell containing a Raman active medium comprising methanol-$d_1$; and
    means for coupling said laser beams through said Raman cell, said laser beam having sufficient power to cause emission of light from said Raman active medium.

* * * * *